(12) United States Patent
Larsen et al.

(10) Patent No.: US 7,819,954 B2
(45) Date of Patent: *Oct. 26, 2010

(54) GAS/LIQUID SEPARATOR INCLUDING A LIQUID TRAP FILTER

(75) Inventors: Michael T. Larsen, Brookfield, WI (US); Leonid B. Soroka, Whitefish Bay, WI (US)

(73) Assignee: Criticare Systems, Inc., Waukesha, WI (US)

( * ) Notice: Subject to any disclaimer, the term of this patent is extended or adjusted under 35 U.S.C. 154(b) by 96 days.

This patent is subject to a terminal disclaimer.

(21) Appl. No.: 12/177,416

(22) Filed: Jul. 22, 2008

(65) Prior Publication Data

US 2009/0013873 A1 Jan. 15, 2009

Related U.S. Application Data (63) Continuation of application No. 11/194,826, filed on Aug. 1, 2005, now Pat. No. 7,402,197, which is a continuation of application No. 10/678,364, filed on Oct. 3, 2003, now Pat. No. 6,923,847, which is a continuation of application No. 10/045,415, filed on Oct. 19, 2001, now abandoned.

(51) Int. Cl.
   *B01D 53/22* (2006.01)
   *A62B 7/10* (2006.01)
(52) U.S. Cl. .................. 96/4; 96/413; 55/394
(58) Field of Classification Search .............. 96/4, 96/396, 413, 417; 55/392, 394, 429, 466; 600/532, 543; 128/205.12; 73/863.23
   See application file for complete search history.

(56) References Cited

U.S. PATENT DOCUMENTS

| 4,465,485 A | 8/1984 | Kashmer et al. |
| 4,546,778 A | 10/1985 | Sullivan |

(Continued)

FOREIGN PATENT DOCUMENTS

DE  10014829 A1  10/2001

(Continued)

OTHER PUBLICATIONS

Internet document "GORE-TEX® and WINDSTOPPER® Fabrics: Outerwear Index"; Website@www.gore.com/corp/fabrics/index. html (prior to Oct. 18, 2001).

(Continued)

*Primary Examiner*—Frank M Lawrence
(74) *Attorney, Agent, or Firm*—Reinhart Boerner Van Deuren s.c.

(57) ABSTRACT

A liquid separator for a respiratory gas sample analyzer includes a closed container having a liquid trap filter chamber integral with the container. The liquid trap filter chamber includes an inlet compartment and an outlet compartment. The inlet compartment is interposed between a sample inlet port and a sample outlet port and includes a gas permeable, liquid impermeable filter element for separating liquid from a gas sample, the liquid separated from the gas sample passing to a collection chamber. The outlet compartment includes a further gas permeable, liquid impermeable trap filter element which is interposed between the collection chamber and a low pressure port, for preventing the flow of liquid through the output compartment to the low pressure port.

16 Claims, 10 Drawing Sheets

U.S. PATENT DOCUMENTS

| | | | |
|---|---|---|---|
| 4,579,568 A | 4/1986 | Ricciardelli et al. |
| 4,713,095 A | 12/1987 | Ricciardelli |
| 4,886,528 A | 12/1989 | Aaltonen et al. |
| 4,921,642 A | 5/1990 | LaTorraca |
| 4,924,860 A | 5/1990 | Larsen et al. |
| 4,985,055 A | 1/1991 | Thorne et al. |
| 5,049,170 A | 9/1991 | Parnoff |
| 5,233,996 A | 8/1993 | Coleman et al. |
| 5,365,938 A | 11/1994 | Eskela |
| 5,368,021 A | 11/1994 | Beard et al. |
| 5,826,575 A | 10/1998 | Lall |
| 6,397,846 B1 | 6/2002 | Skog et al. |
| 6,723,056 B1 | 4/2004 | Alving et al. |
| 6,783,573 B2 | 8/2004 | Richardson |
| 6,923,847 B2 | 8/2005 | Larsen et al. |

FOREIGN PATENT DOCUMENTS

| | | | |
|---|---|---|---|
| JP | | 9-72830 A | 3/1997 |

OTHER PUBLICATIONS

Internet document "GORE-TEX® and WINDSTOPPER® Fabrics: Outerwear Index"; Website@www.gortex.com/products/outerwear.html (prior to Oct. 18, 2001).

GAS/LIQUID SEPARATOR INCLUDING A LIQUID TRAP FILTER

CROSS REFERENCE TO RELATED APPLICATIONS

This application is a continuation of application Ser. No. 11/194,826, filed on Aug. 1, 2005 now U.S. Pat. No. 7,402,197, which is a continuation of application Ser. No. 10/678,364, filed Oct. 3, 2003, now U.S. Pat. No. 6,923,847, which is a continuation of application Ser. No. 10/045,415, filed Oct. 19, 2001, abandoned, which applications are hereby incorporated herein by reference.

BACKGROUND OF THE INVENTION

This invention relates to gas/liquid separators for use with respiratory gas analyzers, and more particularly, to gas/liquid separator including a liquid trap filter for removing liquid from a respiratory gas sample.

Respiratory gas analyzers monitor exhaled air from a patient. It has long been recognized that means must be provided for removing excess moisture from the exhaled air prior to analysis. One technique for removing excess moisture from respiratory gas samples utilizes the effects of surface tension and capillary action to separate water from gas samples. Known gas/liquid separators, or water traps, employing this technique include a separation chamber which has a geometrical configuration designed to draw water away from a gas sample outlet and direct the water to a collection chamber. Examples of such prior art water traps are disclosed in U.S. Pat. Nos. 4,579,568 and 4,713,095 to Ricciardelli. However, these prior art water traps can become filled, and the sample inlet line that conducts exhaled air to the water trap can become blocked with condensed moisture.

Another water trap, disclosed in U.S. Pat. No. 4,924,860, employs a separation chamber having a geometrical configuration similar to the one disclosed in U.S. Pat. No. 4,713,095. This water trap additionally includes self-sealing filters which positively seal the exit ports of the water trap in the event the water trap becomes over filled and can no longer perform its water trap function. In one embodiment, one self-sealing filter is disposed in a sample outlet conduit and a further self-seating filter is disposed in a vacuum conduit. The self-sealing filters comprise a porous matrix including means for rendering the porous matrix substantially non-porous when exposed to water, thereby blocking the exit ports of the water trap.

SUMMARY OF THE INVENTION

The present invention provides a liquid separator for use with a gas analyzer for separating liquid from a gas sample to be analyzed. The liquid separator comprises a container including a sample inlet port, a sample outlet port and a liquid trap filter chamber integral with the container. The liquid trap filter chamber includes an inlet compartment which has an upper outlet communicated with the sample outlet port and a lower outlet communicated with a collection chamber. A liquid trap filter element is contained in the inlet compartment for separating liquid from the gas sample, liquid separated from the gas sample passing through the lower outlet of said inlet compartment to the collection chamber.

In one embodiment, the liquid trap filter chamber includes an outlet compartment which is interposed between the collection chamber and a low pressure port, the outlet compartment having an inlet communicated with the collection chamber and an outlet communicated with the low pressure port. A second liquid trap filter element is contained in the outlet compartment interposed between the inlet and the outlet of the outlet compartment.

Further in accordance with the invention, there is provided a liquid separator for a gas analyzer which comprises a separation compartment for separating liquid from a gas sample. The separation compartment includes an upper outlet communicated with a sample outlet port and a lower outlet communicated with a collection chamber for receiving and storing liquid separated from the gas sample. The liquid separator further comprises an outlet compartment which is interposed between the collection chamber and a low pressure port. The outlet compartment contains a liquid trap filter element for preventing the flow of liquid through the outlet compartment from the collection chamber to the low pressure port.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

DETAILED DESCRIPTION OF THE PREFERRED EMBODIMENTS

Figures 1, 2:
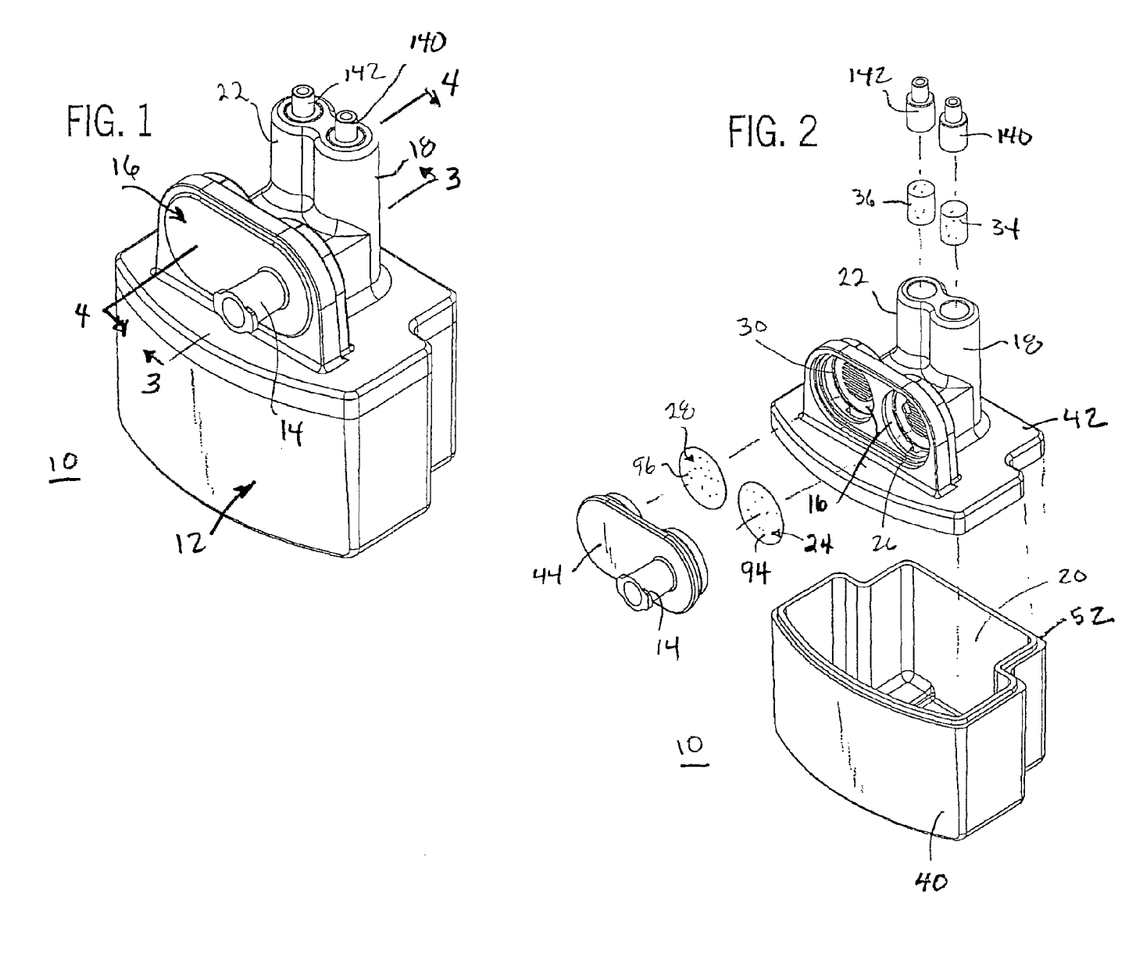
FIG. 1 is a perspective view of a gas/liquid separator in accordance with the invention.
FIG. 2 is an exploded view of the gas/liquid separator of FIG. 1.

Referring to the drawings, FIGS. 1 and 2 illustrate a gas/liquid separator 10 in accordance with one embodiment of the invention. The gas/liquid separator 10, hereinafter liquid separator, includes a closed container 12, a gas/liquid sample inlet port 14, a liquid trap filter chamber 16, a sample outlet port 18, a trap reservoir or liquid collection chamber 20 and a low pressure port 22.

A gas permeable, liquid impermeable trap filter element 24 is contained in an inlet trap filter compartment 26 of the liquid trap filter chamber 16, interposed between the inlet port 14 and the sample outlet port 18 for separating liquid from the respiratory sample. A further gas permeable, liquid impermeable trap filter element 28 is contained in an outlet compartment 30 of the liquid trap filter chamber 16, interposed between the collection chamber 20 and the low pressure port 22. The liquid separator 10 can include a self-sealing, hydrophilic filter 34 in the sample outlet port 18 and a further self-sealing, hydrophilic filter 36 in the low pressure port 22.

Figure 3:
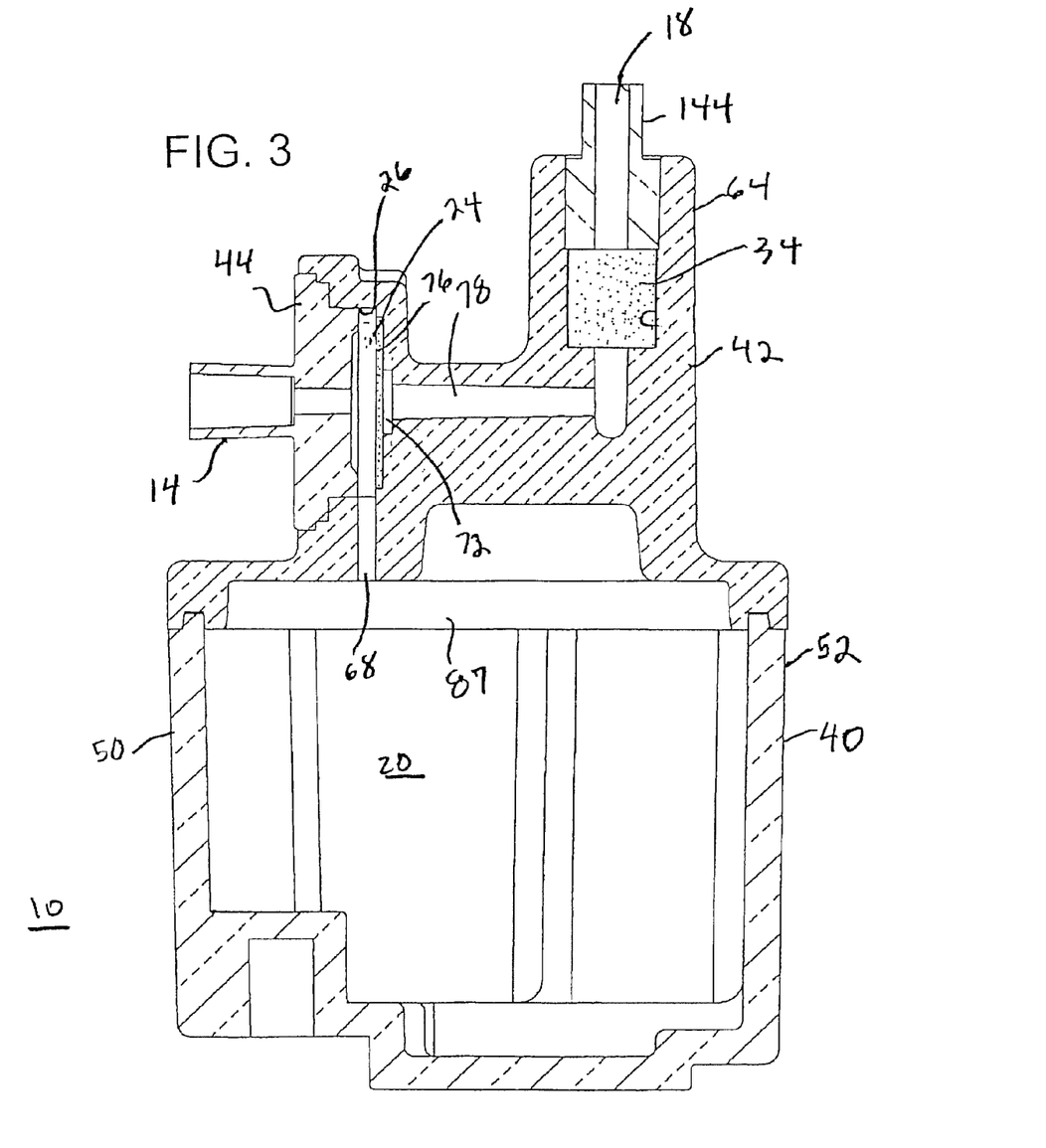
FIG. 3 is a vertical section view of the gas/liquid separator taken along the line 3-3 of FIG. 1.

Briefly, with reference to FIGS. 1, 2 and 3, a sample respiratory gas of exhaled air is introduced into the liquid separator through the sample inlet port 14. The liquid trap filter element 24 in inlet trap filter compartment 26 separates liquid from the sample respiratory gas. Liquid from the respiratory sample exits the liquid trap filter compartment 16 and flows into the liquid collection chamber 20, while the gas sample leaves the inlet trap filter compartment 26 via the sample outlet port 18. In one embodiment, the low pressure port 22 can be connected to a vacuum pump to produce a low pressure within the collection chamber 20 by withdrawing air from the collection chamber through the outlet trap filter compartment 30.

Figure 4:
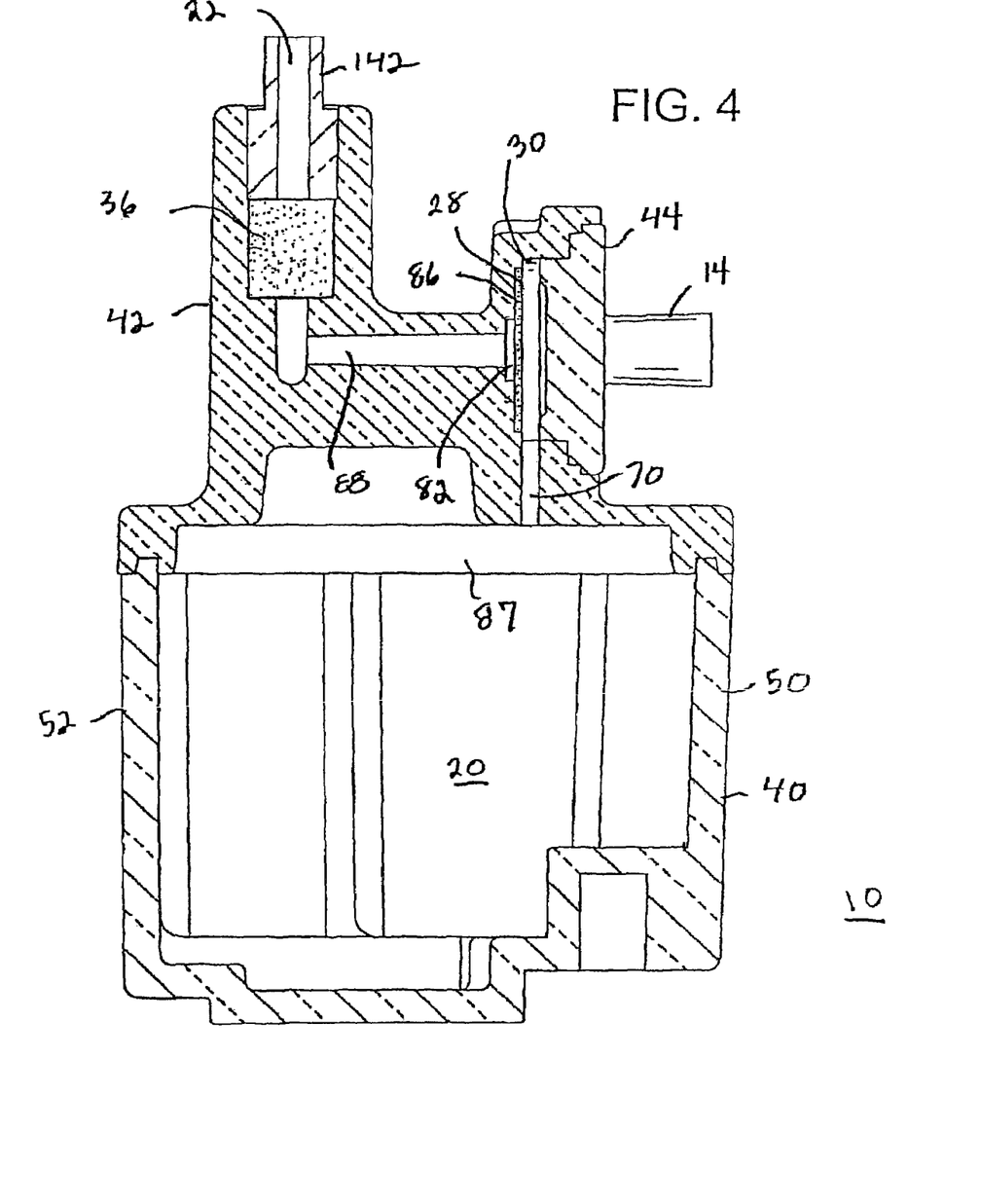
FIG. 4 is a vertical section view of the gas/liquid separator taken along the line 4-4 of FIG. 1.

The liquid separator 10 provided by the present invention, employs a gas permeable, liquid impermeable trap filter element 24 for separating liquid in contrast to a separation chamber, the operation of which is dependent upon the geometrical configuration of the separation chamber, as is the case for the water traps disclosed in the patents referenced above. Moreover, the gas permeable, liquid impermeable trap filter element 28, which is interposed between the collection chamber 20 and the low pressure port 22 as shown in FIG. 4, for example, is used to substantially prevent liquid from the collection chamber 20 from being drawn through the outlet trap filter compartment 30 and into the low pressure port 22.

Figure 5:
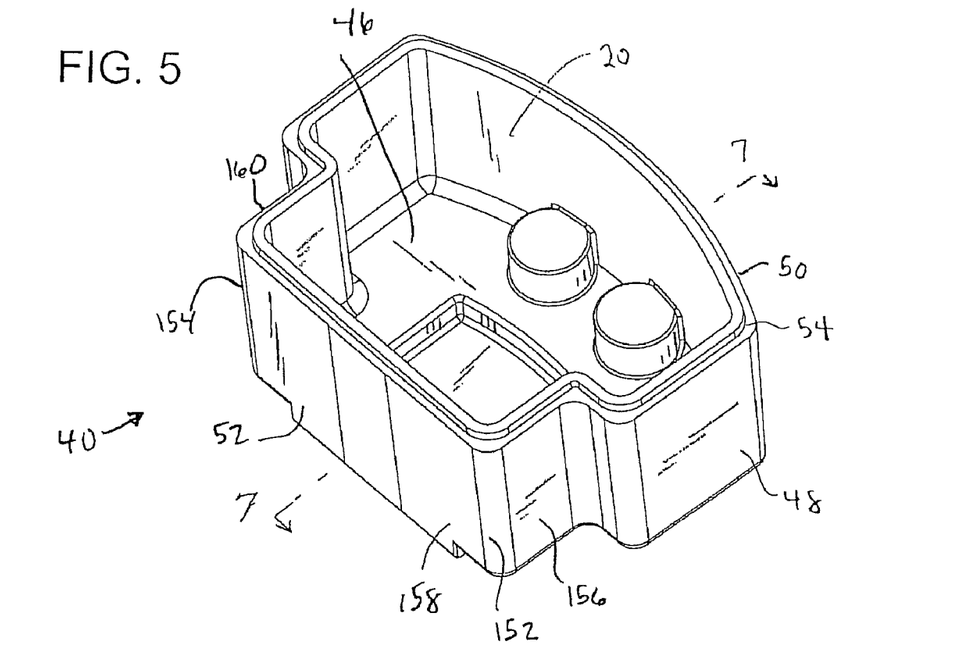
FIG. 5 is a perspective view of a base of the gas/liquid separator of FIG. 1.
Figure 6:
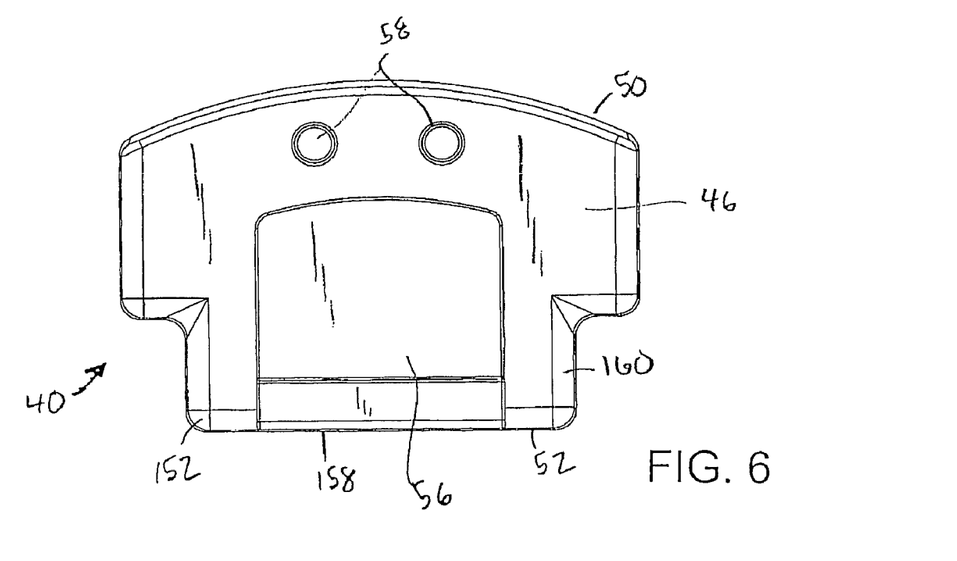
FIG. 6 is a bottom plan view of the base of FIG. 5.
Figure 7:
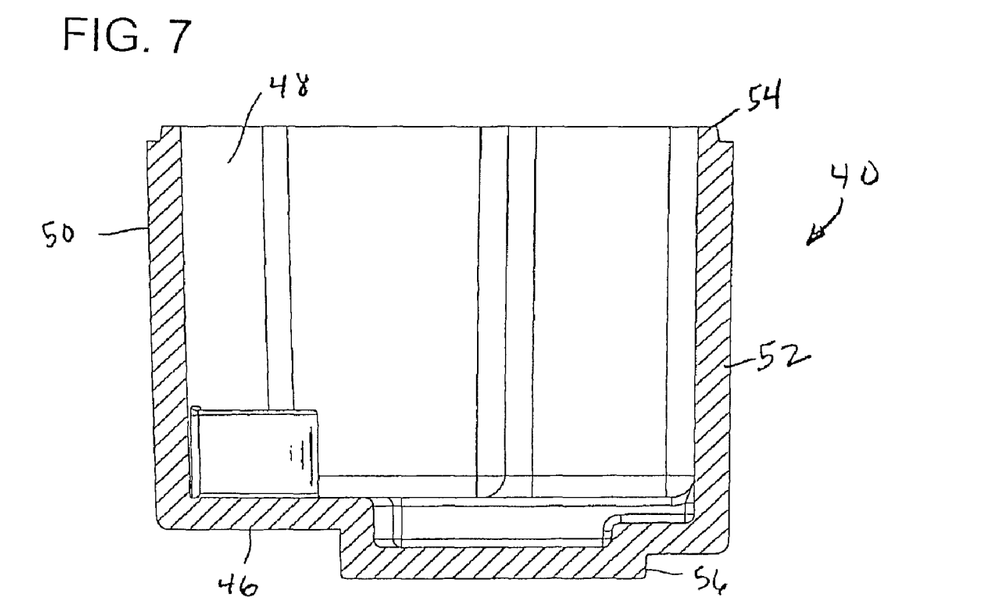
FIG. 7 is a vertical section view of the base of FIG. 5.

Considering the liquid separator 10 in more detail, with reference also to FIGS. 5-7, the container 12 includes a base 40, a top 42 and a cover 44. In one embodiment, the base 40, top 42 and cover 44 are molded of a rigid transparent plastic, such as plexiglass.

The base 40, which defines the collection chamber 20, is a cup-like member which is closed at its lower end by a base member 46 and which has an open upper end defined by an upwardly projecting side wall 48. The side wall 48 includes a forward portion 50, a rearward portion 52 and an upper peripheral edge 54. The outer surface of the base member 46 includes a raised portion 56, which extends forwardly from near rearward portion 52, and a pair of recesses 58, located near forward portion 50, for a purpose to be shown.

The top 42 is mounted on the upper peripheral edge 54 of the base 40, as shown in FIG. 1, closing the upper end of the base 40 to form the closed container 12 including the collection chamber 20.

Referring to FIGS. 1, 2, 8, 9 and 11, the top 42 includes a base 60, a filter housing 62 and a pair of upwardly extending bosses 64 and 66. The filter housing is located near the forward portion 61 of the top 42 and defines the liquid trap filter chamber 16. The bosses 64 and 66 are located near the rearward portion 63 of the top 42 and define the sample outlet port 18 and the low pressure port 22, respectively.

Figure 8:
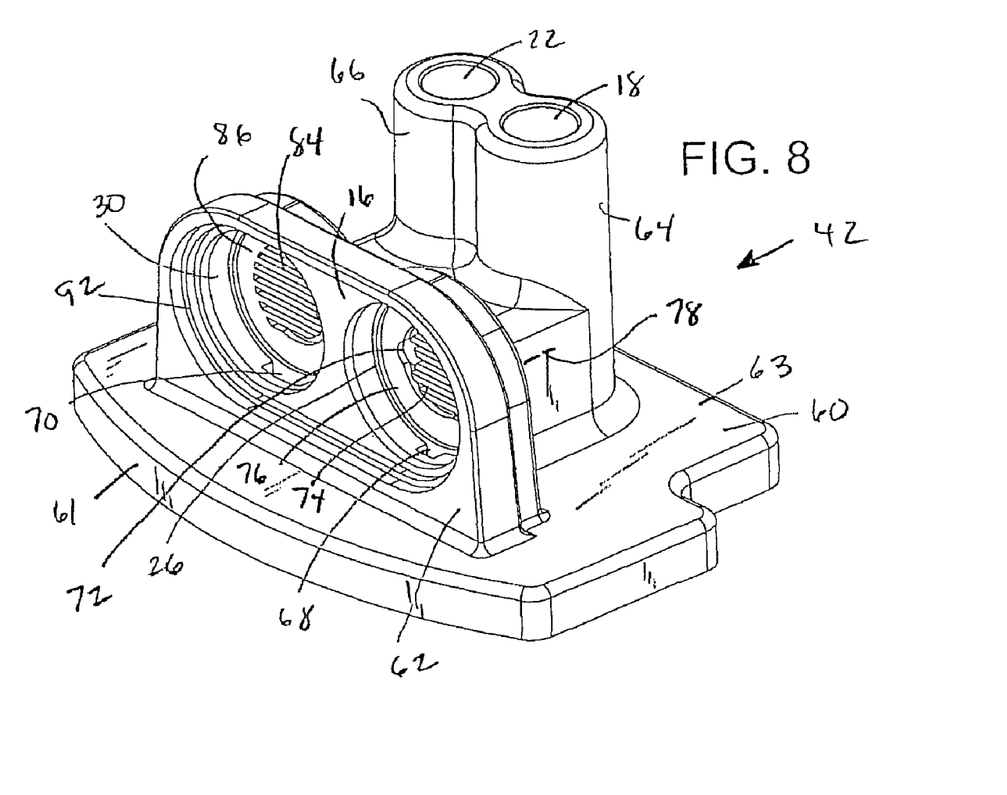
FIG. 8 is a perspective view of a top of the gas/liquid separator of FIG. 1.
Figure 9:
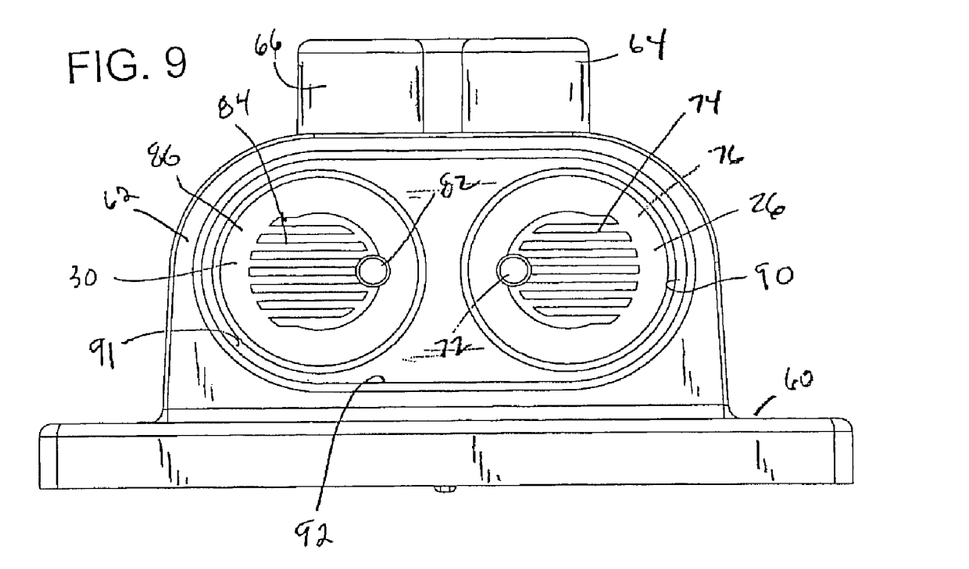
FIG. 9 is a front elevation view of the top of FIG. 8.
Figure 11:
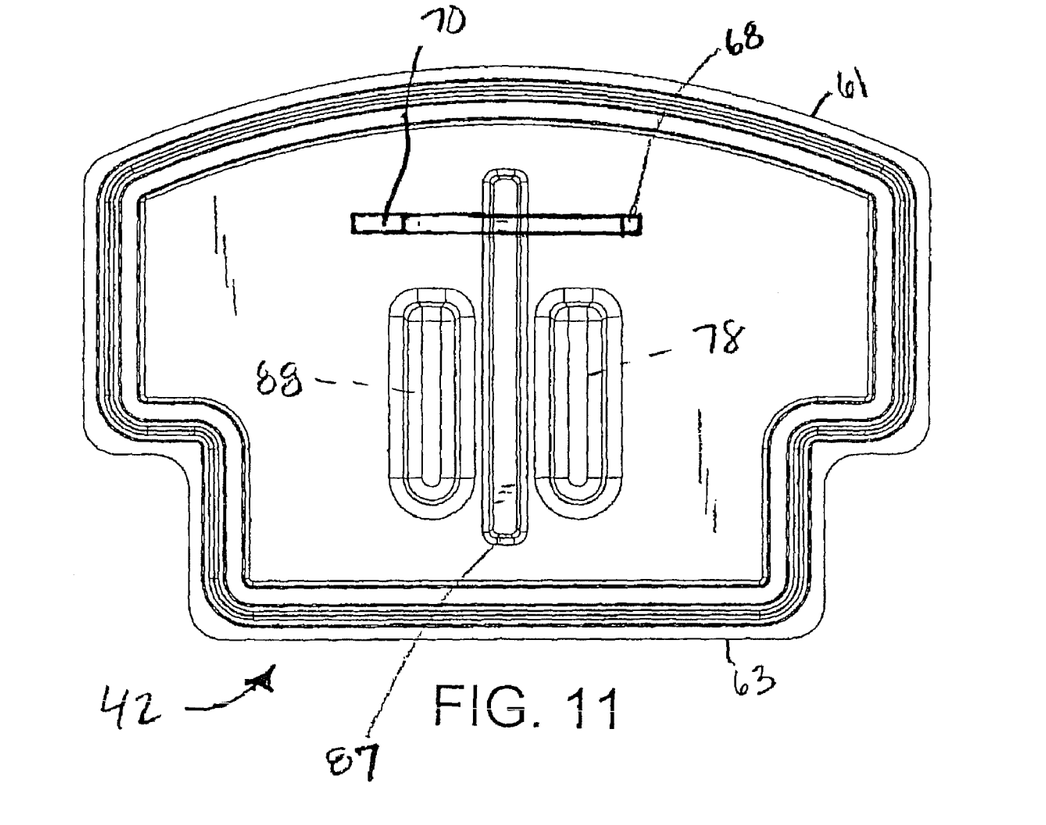
FIG. 11 is a bottom plan view of the top of FIG. 8.

The inlet trap filter compartment 26 of the liquid trap filter chamber 16 has a lower outlet 68 in fluid communication with the collection chamber 20. The lower outlet 68 is located forwardly of a back wall or barrier 76 of the inlet trap filter compartment 26. Similarly, the outlet trap filter compartment 30 of the liquid trap filter chamber 16 has a lower inlet 70 in fluid communication with the collection chamber 20. The lower inlet 70 is located forwardly of a back wall or barrier 86 of the outlet trap filter compartment 30.

The inlet trap filter compartment 26 has an upper outlet 72 located near the center of the cover 42. In one embodiment, the axis of the upper outlet 72 can be offset with respect to the axis of the inlet trap filter compartment 26 to bring the upper outlet 72 in line with the sample outlet port 18 while maximizing the active surface area of the trap filter element 24. The inlet trap filter compartment 26 further includes a support web 74 formed on the back wall 76 thereof. The support web 74 supports the trap filter element 24 within the inlet trap filter compartment 26 to prevent excessive stress on the trap filter element 24. The support web spaces the trap filter element 24 forwardly of the back wall providing an active area through which gas can flow. The support web 74 also prevents the trap filter element 24 from being drawn against the back wall 76 by vacuum. The back wall 76 defines the upper outlet 72 of the inlet trap filter compartment 26.

Similarly, the outlet trap filter compartment 30 has an upper outlet 82 (FIG. 9) located near the center of the cover 42. In one embodiment, the axis of the upper outlet 82 is offset with respect to the axis of the outlet trap filter compartment 30 to bring the upper outlet 82 in line with the low pressure port 22 while maximizing the active surface area of the trap filter element 28. The outlet trap filter compartment 30 includes a support web 84, similar in structure and function to support web 74, on the back wall 86. The support web 84 supports the trap filter element 28 within the outlet trap filter compartment 30, preventing excess stress on the trap filter element 28 and spaces the trap filter element 28 forwardly of the back wall 86, providing an active area through which gas can flow. The support web 84 also prevents the trap filter element 28 from being drawn against the back wall 86 by vacuum. The back wall 86 defines the upper outlet 82 for the outlet trap filter compartment 30. The surface of the top 42 surrounding the inlet and outlet trap filter compartments 26 and 30 can be stepped as indicated by reference numbers 90 and 91, respectively. The top 42 has a stepped inner edge 92 which extends around the periphery of the trap filter compartments 26 and 30.

In one embodiment, the gas permeable, liquid impermeable trap filter elements 24 and 28 can be a membrane filter element such as GORE-TEX expanded polytetrafluoroethylene (PTFE) laminate having a one micron pore size on spunbonded polyester, with the PTFE laminate surfaces 94 and 96 of trap filter elements 24 and 28, respectively, facing forwardly. In one embodiment, the trap filter elements 24 and 28 can be permanently bonded to the back walls 76 and 86. The cover 44 is mounted on the top 42, overlying the open side of the trap filter chamber 16, closing the trap filter chamber and can aid in holding the trap filter elements 24 and 28 in place in the inlet and outlet trap filter compartments. The cover 44 also separates the inlet trap filter compartment 26 from the outlet trap filter compartment 30.

Figure 10:
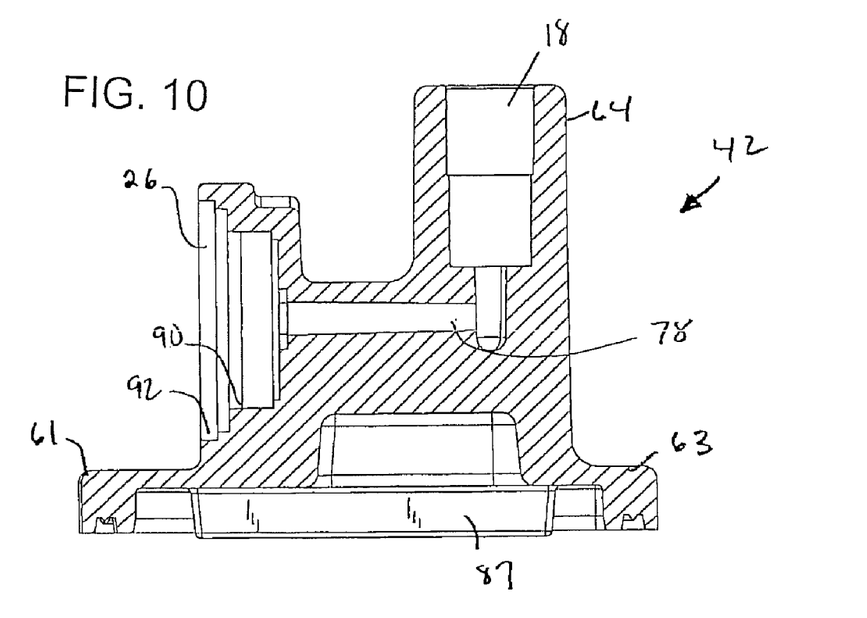
FIG. 10 is a vertical section view of the top of FIG. 8.

The top 42 includes an interior conduit 78, shown in FIGS. 3 and 10, for example, which communicates the upper outlet 72 of the inlet trap filter compartment 26 with the sample outlet port 18. A further interior conduit 88 communicates the upper outlet 82 of the outlet trap filter compartment 30 with the low pressure port 22 as shown in FIG. 4, for example. The upper outlet 82 is communicated with the collection chamber 20 only through the trap filter element 28 and the lower inlet 70. There is no direct connection between the sample outlet port 18 and the collection chamber 20. Also, the sample inlet 14 is communicated with the sample outlet port 18 only through the trap filter element 24. The top includes a baffle 87 which extends from the bottom of the cover 42, beneath the liquid trap filter chamber 16. The baffle 87 extends from near the forward portion 61 and to the rearward portion 63 of the top 42 and is located between the reservoir inlet or lower outlet port 68 (FIG. 8) of the inlet trap filter compartment and the lower inlet port 70 outlet trap filter compartment, providing a barrier therebetween. The baffle 87 blocks the growth of any bubbles emanating from the trap reservoir inlet 68 before the bubbles can reach the trap reservoir outlet 70. The baffle 87 slows down the bubbles so that the bubbles burst prior to reaching the trap reservoir outlet 70.

In one embodiment, the base 40 and the top 42 can be produced as independent components with the top 42 being permanently secured to the base 40 such that the container 12 is an integral, one-piece member. By way of example, the top 42 can be secured to the base 40 by ultrasonic welding techniques, or by any other bonding techniques, such as by the use of epoxy type cement or solvent type cement. Whatever the technique used, the junction between the base 40 and the top 42 should be leak proof and secure in the presence of water and 100% humidity.

Figure 12:
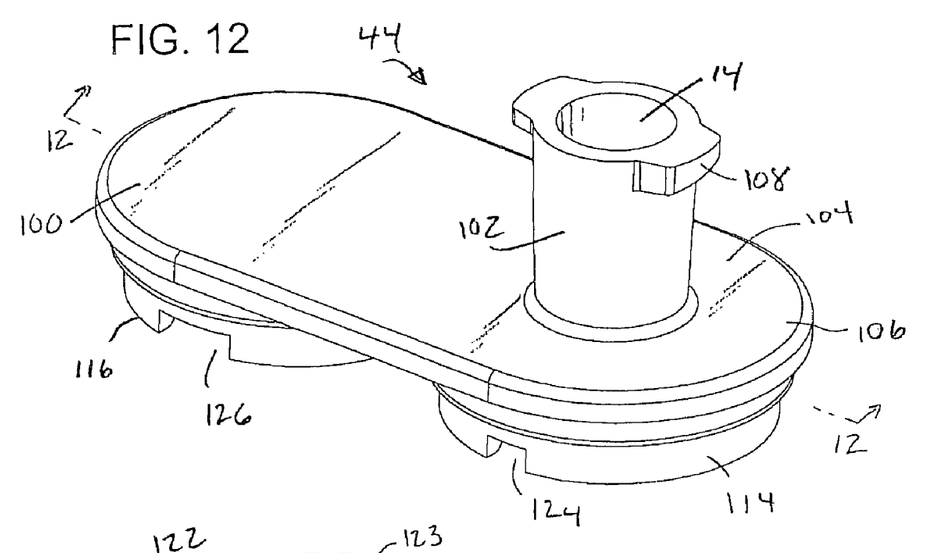
FIG. 12 is a front perspective view of a cover of the gas/liquid separator of FIG. 1.
Figure 13:
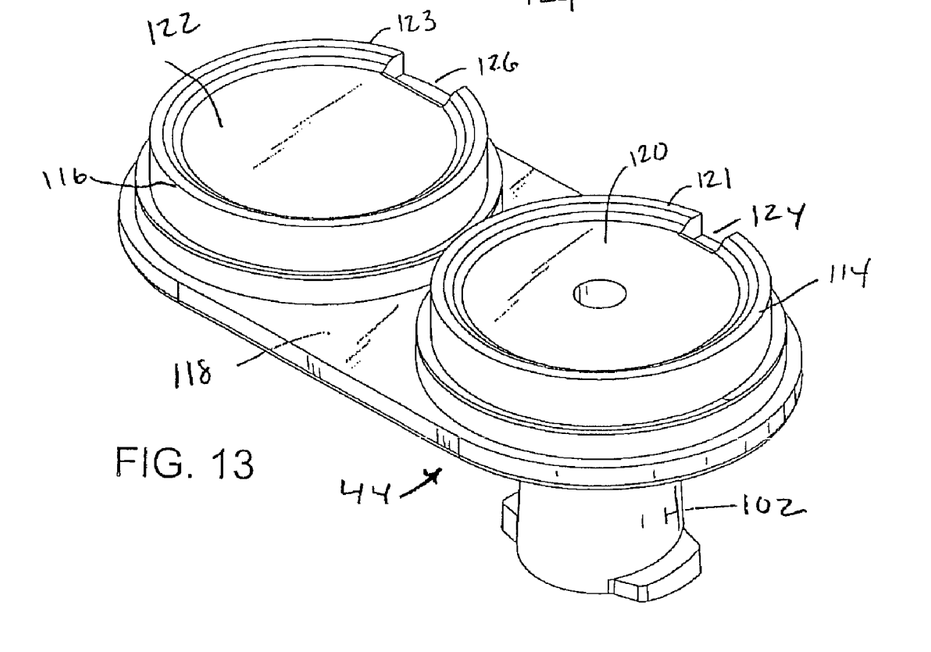
FIG. 13 is a back perspective view of the cover of FIG. 12.
Figure 14:
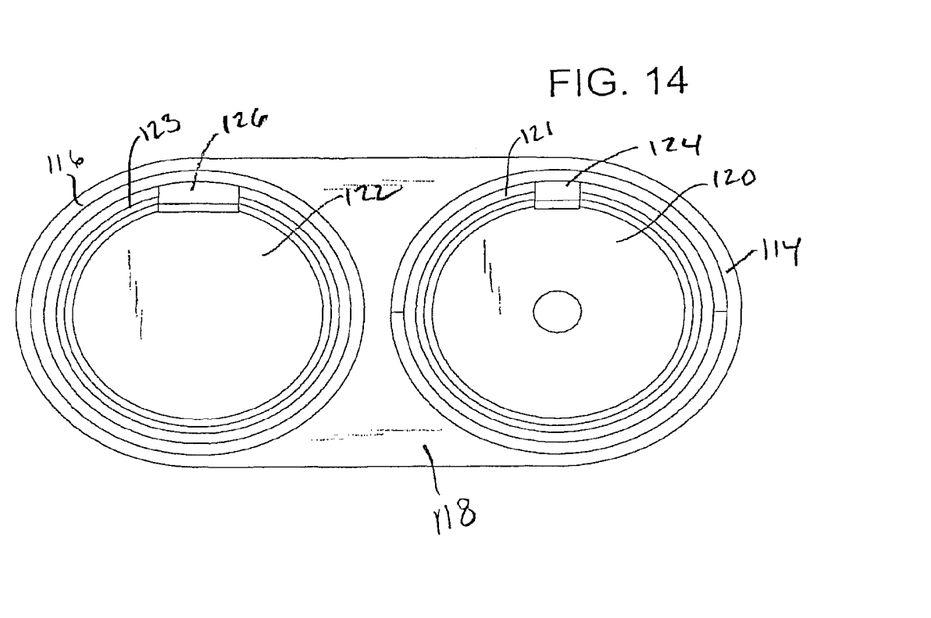
FIG. 14 is a plan view of the back of the cover of FIG. 12.
Figure 15:
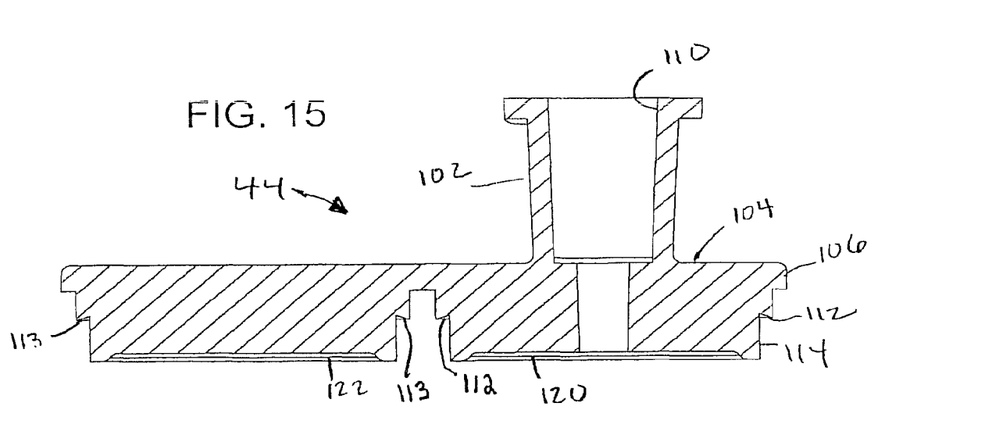
FIG. 15 is a section view of the cover of FIG. 12.

Referring to FIGS. 12-14, the cover 44 includes a flat, oval base with a hollow cylindrical boss 102 projecting outwardly therefrom on one side 104 near one end 106 thereof, defining the inlet port 14. The boss 102 defines a female luer connection as indicated generally at 108. Referring also to FIG. 15, the boss 102 includes a through bore 110. The cover 44 includes annular steps 112 and 113 which mate with corresponding surfaces of the top 42 to provide sealing between the cover and the top for the trap filter inlet and the trap filter outlet compartments.

The cover 44 has two raised annular portions 114 and 116 on its opposite side 118. The annular portions 114 and 116 have concave, filter engaging surfaces 120 and 122 surrounded by an annular peripheral rims 121 and 123, respectively. One of the annular filter engaging portions 114 has a notch 124 in rim 121 near its lower end, which is located adjacent to and in fluid communication with a notch in the cover 42 that defines the lower outlet 68 of the inlet trap filter compartment 26, outwardly of the trap filter element 24. Liquid trapped at the forward side of the filter element can pass through the notch 124 to the lower outlet or trap reservoir outlet 68. Similarly, annular portion 116 has a notch 126 in rim 123 near its lower end which is located adjacent to and in fluid communication with a notch in the cover 42 that defines the lower inlet or trap reservoir outlet 70 of the outlet trap filter compartment 30. In one embodiment, the cover 44 can be secured to the top 42 by ultrasonic welding techniques, or by any other bonding techniques, such as by the use of epoxy type cement or solvent type cement. Whatever the technique used, the junction between the cover 44 and the top 42 should be leak proof and secure in the presence of water and 100% humidity.

Figure 16:
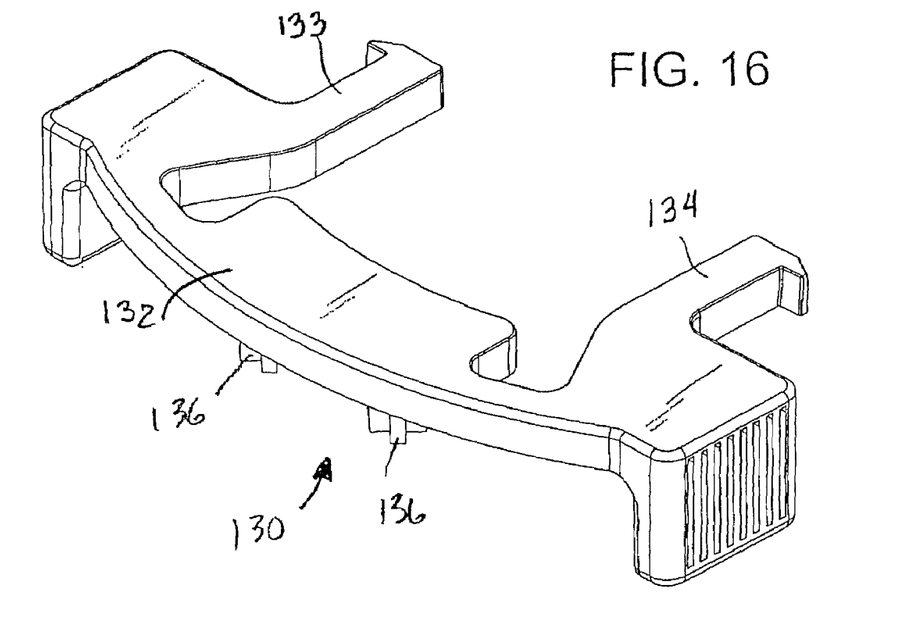
FIG. 16 is a perspective view of a mounting clip for use with the gas/liquid separator of FIG. 1.
Figure 17:
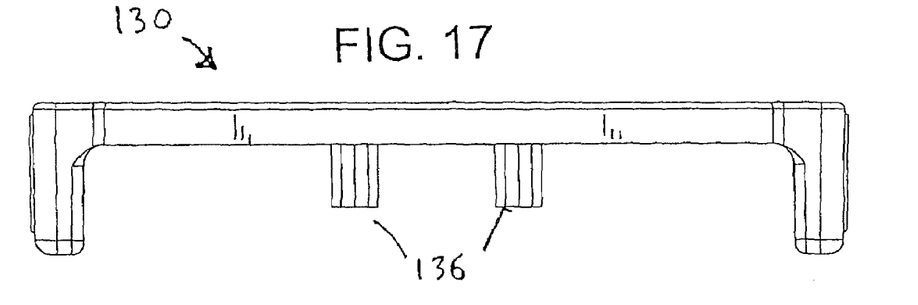
FIG. 17 is a front elevation view of the mounting clip of FIG. 16.

Referring to FIG. 16, there is shown a mounting clip 130 which can be used to facilitate attachment of the liquid separator to a gas analyzer (not shown) with which it is used. The mounting clip 130 includes a base portion 132 with a pair of flexible arms 133,134 with hooked ends. The arms 133 and 134 are sized to engage the raised portion on the outer surface of the base member. The mounting clip 130 includes projections or posts 136 which are received in the recesses 58 (FIG. 6) in the outer surface of the base member 46. The mounting clip 130 can be made of a plastic material such as cycoloy, for example.

Referring to FIGS. 1, 6 and 16, the mounting clip 130 can be pressed onto the bottom of the base 40, with the posts 136 located in the recesses 58 and the arms 133 and 134 fitting around and resiliently engaging the raised bottom portion 56 of the base member 46. In another embodiment, one or both of the back outer corners 152 and 154 of the base 40 (FIGS. 3 and 6) can include a serrated surface and/or can project outwardly beyond the plane of the adjacent pair of sides 156,158 and 158,160, to provide a interference fit between the liquid separator and the manifold of a gas analyzer with which the liquid separator is used. In this embodiment, the retaining clip does not have to be used.

Referring to FIGS. 1-4, the self-sealing, hydrophilic line filters 34 and 36 can be similar to those disclosed in U.S. Pat. No. 4,924,860, which is incorporated herein by reference for its teaching as to self-sealing filters. Filter plugs 140 and 142 can be pressed into the top of the bosses 64 and 66 and be glued or otherwise secured to the bosses to maintain the line filters 34 and 36 in place. The filter plugs 140 and 142 can be made of a plastic material such as plexiglass, for example.

As more fully described in U.S. Pat. No. 4,924,860 referenced above, the self-sealing filters 34 and 36 preferably comprise a cellulose extract disposed in the plastic material to seal the pores when it comes into contact with a liquid, such as water. The self-sealing filters 34 and 36 are normally "open". The filters 34 and 36 ensure that no fluid contamination is able to reach the gas monitoring system with which the gas/liquid separator 10 is used. For example, in the event the collection chamber 20 becomes filled with collected water and water rises to a level sufficient to allow the water to come into contact with the self-sealing filters 34 and 36, the filters 34 and 36 immediately become non-porous, thereby sealing the respective conduits as to both liquid flow and gas flow therethrough. As is described in detail in U.S. Pat. No. 4,924,860, the filters 34 and 36 operate as a water sensor which signals undesired water presence to a suitable control system for appropriate action. In this way, liquid, including water and mucous secretions, are reliably prevented from entering the gas analyzer. This is an important advantage, because considerable time and expense can be required to clean a gas analyzer once contaminated by liquid.

Referring to FIGS. 1, 3, and 4, the operation of the liquid separator 10 is apparent from the foregoing detailed description, and accordingly, the following is a brief description of the operation. A vacuum is applied to the low pressure port 22, drawing air out of the collection chamber 20 through the outlet trap filter compartment 30. The low pressure port 22 is normally in fluid communication with the outlet side of the outlet trap filter compartment 30 through conduit 88 and the upper outlet 82. The inlet side of the outlet trap filter compartment 30, in turn, is communicated with the collection chamber 20 through lower inlet 70. However the trap filter element 28 in the outlet trap filter compartment 30 substantially blocks the passage of liquid from the collection chamber 20 to the low pressure port 22.

A sample respiratory gas of exhaled air is introduced into the gas/liquid sample inlet port 14 and passed into the inlet trap filter compartment. The trap filter element 24 in inlet trap filter compartment 26 separates liquid from the sample respiratory gas. Liquid from the sample falls by gravity to the bottom of the inlet trap filter compartment 26 and flows through the lower outlet 68 into the liquid collection chamber 20. The gas sample, passed through the filter element 24, passes through the upper outlet 72 and conduit 78 to the sample outlet port 18 from which the gas sample can be applied to a gas analyzer (not shown).

The container 12 is transparent to allow a care giver to know when the collection chamber 20 is close to being filled so that the liquid separator 10 can be changed. In the event the liquid separator 10 becomes over filled and can no longer perform its function, the self-sealing filter 34 and 36, disposed in the sample outlet port 18 and low pressure outlet 22 become substantially non-porous, thereby blocking the exit ports of the liquid separator 10.

The liquid separator 10 can be used in a conventional gas analyzer in which the physical sealing effect provided by the self-sealing filters 34 and 36 protects the gas analyzer from liquid contamination. However, the liquid separator 10 is preferably used in a gas analyzer, such as that disclosed in U.S. Pat. No. 4,924,860, referenced above, which monitors pressures in a conduit coupled to the low pressure port and a conduit coupled to the sample outlet port to detect sealing by the self-sealing filter.

While preferred embodiments have been illustrated and described, it should be understood that changes and modifications can be made thereto without departing from the invention in its broadest aspects. Various features of the invention are defined in the following claims.

What is claimed is:

1. A liquid separator for a gas analyzer, said liquid separator comprising:
    a closed container including a sample inlet port, a sample outlet port, and a low pressure port;
    said container defining a liquid collection chamber and a liquid trap filter chamber, said liquid trap filter chamber including an inlet compartment interposed between said sample inlet port and said sample outlet port for receiving a gas sample introduced into said sample inlet port, said inlet compartment having an upper outlet communicated with said sample outlet port and a lower outlet communicated with said liquid collection chamber;
    a liquid trap filter element contained in said inlet compartment interposed between said sample inlet port and said sample outlet port for separating liquid from the gas sample, liquid separated from the gas sample passing through said lower outlet to said collection chamber, said inlet compartment having a back wall defining said upper outlet, said lower outlet being located forwardly of said back wall, said filter element overlying said back wall of said inlet compartment, interposed between said sample inlet port and said upper outlet; and
    a support on said back wall of said inlet compartment, supporting a center portion of said filter element within said inlet compartment, spaced apart from said back wall, preventing said filter element from being drawn against said back wall by vacuum and providing an active area through which gas can flow.

2. The liquid separator according to claim 1, wherein said inlet compartment wherein said back wall is interposed between said filter element and said sample outlet port.

3. The liquid separator according to claim 2, wherein said liquid trap filter chamber includes a cover which encloses said filter element within said inlet compartment.

4. The liquid separator according to claim 3, wherein said cover includes at least one concave filter engaging surface engaging said filter element to trap said filter element between said cover and said back wall.

5. The liquid separator according to claim 1, wherein said filter element comprises a membrane bearing a polytetrafluoroethylene laminate.

6. The liquid separator according to claim 1, wherein said liquid trap filter chamber includes an outlet compartment interposed between said collection chamber and said low pressure port, said outlet compartment having an inlet communicated with said collection chamber and an outlet communicated with said low pressure port, said outlet compartment having a back wall defining said outlet of said outlet compartment, and a further liquid trap filter element contained in said outlet compartment, said further liquid trap filter element overlying said back wall of said outlet compartment interposed between said inlet and said outlet of said outlet compartment.

7. The liquid separator according to claim 6, wherein said back wall of said outlet compartment defines said outlet of said outlet compartment.

8. The liquid separator according to claim 6, wherein said further filter element comprises a membrane bearing a polytetrafluoroethylene laminate.

9. The liquid separator according to claim 1, and including a self-sealing filter in at least one of said sample outlet port and said low pressure port.

10. A liquid separator for a gas analyzer, said liquid separator comprising:
    a sample inlet port;
    a sample outlet port;
    an inlet compartment having an inlet in fluid communication with said sample inlet port for receiving a gas sample introduced into said sample inlet port, said inlet compartment having an upper outlet communicated with said sample outlet port, said inlet compartment having a back wall defining said upper outlet, said lower outlet being located forwardly of said back wall;
    a liquid collection chamber in fluid communication with said inlet compartment for receiving liquid from said inlet compartment;
    a low pressure port;
    an outlet compartment interposed between said collection chamber and said low pressure port, said outlet compartment having an inlet communicated with said collection chamber and an outlet communicated with said low pressure port, said outlet compartment having a back wall defining said outlet of said outlet compartment; and
    a gas permeable, liquid impermeable filter element contained in one of said inlet compartment and said outlet compartment, said filter element overlying said back wall of said one compartment, interposed between said inlet and outlet of said one compartment for substantially preventing flow of liquid while allowing the flow of gas from said inlet to said outlet of said one compartment; and
    a support on said back wall of said one compartment supporting a center portion of said filter element within said one compartment, spaced apart from said back wall of said one compartment, preventing said filter element from being drawn against said back wall of said one compartment by vacuum and providing an active area through which gas can flow.

11. The liquid separator according to claim 10, wherein said filter element is contained in said inlet compartment interposed between said sample inlet port and said upper outlet for separating liquid from the gas sample.

12. The liquid separator according to claim 10, wherein said filter element is contained in said outlet compartment interposed between said inlet of said outlet compartment and said outlet of said outlet compartment for substantially preventing the passage of liquid through said outlet compartment to said low pressure port.

13. The liquid separator according to claim 10, wherein at least said one compartment includes a cover separating said inlet and outlet compartments.

14. A liquid separator according to claim 10, wherein said filter element comprises a membrane bearing a polytetrafluoroethylene laminate.

15. The liquid separator according to claim 10, including a self-sealing filter in at least one of said sample outlet port and said low pressure port.

16. A liquid separator for a gas analyzer, said liquid separator comprising:

a sample inlet port;

a sample outlet port;

a collection chamber;

an inlet compartment for receiving a gas sample introduced into said sample inlet port, said inlet compartment having an upper outlet communicated with said sample outlet port and a lower outlet communicated with said collection chamber, said inlet compartment having a back wall defining said upper outlet, said lower outlet being located forwardly of said back wall of said inlet compartment, said filter element overlying said back wall of said inlet compartment, interposed between said sample inlet port and said upper outlet;

a first gas permeable, liquid impermeable filter element contained in said inlet compartment, said first filter element overlying said back wall of said inlet compartment, interposed between said sample inlet port and said upper outlet for separating liquid from the gas sample;

a support on said back wall of said inlet compartment supporting a center portion of said first filter element within said inlet compartment, spaced apart from said back wall, preventing said first filter element from being drawn against said back wall of said inlet compartment by vacuum and providing an active area through which gas can flow said liquid collection chamber receiving liquid passed through said lower outlet of said inlet trap filter compartment;

a low pressure port;

an outlet compartment interposed between said collection chamber and said low pressure port, said outlet compartment having an inlet communicated with said collection chamber and an outlet communicated with said low pressure port, said outlet compartment having a back wall defining said inlet of said outlet compartment;

a second gas permeable, liquid impermeable filter element contained in said outlet compartment, said second filter element overlying said back wall of said outlet compartment, interposed between said inlet and said outlet of said outlet compartment; and a support on said back wall of said outlet compartment supporting a center portion of said second filter element within said outlet compartment, spaced apart from said back wall of said outlet compartment, preventing said second filter element from being drawn against said back wall of said outlet compartment by vacuum and providing an active area through which gas can flow.

\* \* \* \* \*